United States Patent
Easton

(10) Patent No.: US 6,298,931 B1
(45) Date of Patent: Oct. 9, 2001

(54) TRACKED VEHICLE STEERING CONTROL SYSTEM WITH NON-CENTERED STEERING WHEEL

(75) Inventor: David Joseph Easton, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/456,701

(22) Filed: Dec. 9, 1999

(51) Int. Cl.[7] .................................................. B62D 11/08
(52) U.S. Cl. ......................... 180/6.44; 180/9.44; 701/41; 192/30 W
(58) Field of Search ......................... 192/30 W; 180/9.1, 180/9.44, 6.2, 6.44, 6.48; 701/41

(56) References Cited

U.S. PATENT DOCUMENTS

| | | | |
|---|---|---|---|
| 3,917,014 | * 11/1975 | Ward | 180/6.48 |
| 3,994,352 | * 11/1976 | Siorek | 180/9.2 R |
| 5,029,678 | * 7/1991 | Koshizawa | 192/30 W |
| 5,181,593 | * 1/1993 | Flotow | 192/30 W |
| 5,390,751 | 2/1995 | Puetz et al. | 180/6.48 |
| 5,538,118 | * 7/1996 | Kempf | 192/33 C |
| 5,611,405 | * 3/1997 | Ishino et al. | 180/6.44 |
| 5,948,029 | * 9/1999 | Straetker | 701/41 |
| 6,000,490 | * 12/1999 | Easton | 180/402 |
| 6,039,132 | * 3/2000 | Easton | 180/6.44 |
| 6,208,922 | * 3/2001 | Easton | 701/41 |

OTHER PUBLICATIONS

National Semiconductor, LM628/LM629 Precision Motion Controller, Feb. 1995, 1 page.

* cited by examiner

Primary Examiner—Brian L. Johnson
Assistant Examiner—Avraham H. Lerner

(57) ABSTRACT

A control system controls a tracked vehicle drive/steering system which has an engine driven hydraulic steering pump which drives a hydraulic steering motor. In one embodiment, the control system operates to gradually reduce the magnitude of the steering pump control signals if the vehicle is stationary, the clutch is engaged and these conditions persist for at least a certain time period, and to further or more rapidly reduce the magnitude if the vehicle seat is not occupied. In an alternate embodiment, the control system operates to limit the magnitude of the steering pump control signals as a function of the acceleration of wheel speed. In another alternate embodiment, the control system operates to quickly reduce the magnitude of the steering pump control signals if the vehicle is stationary, the clutch is engaged and the transmission is commanded to be in a non-neutral gear, between the time the ear is commanded and the vehicle motion begins.

18 Claims, 3 Drawing Sheets

TRACKED VEHICLE STEERING CONTROL SYSTEM WITH NON-CENTERED STEERING WHEEL

BACKGROUND OF THE INVENTION

The present invention relates to a tracked vehicle drive/steering system.

When operating a vehicle, it is desirable for the operator to be able to perceive the turning status of the vehicle and/or to prevent unintentional vehicle turning upon initiation of vehicle motion. For example, when an operator starts a vehicle moving, it is desirable that the operator be able to know whether or not the vehicle will begin turning as it starts to move. In most conventional tractors, it is possible to discern the turning status of the tractor by viewing the position of the steerable wheels. On most current production tracked vehicles, there are no steerable wheels, but there is a spring centered steering wheel, and the steering is centered unless the operator holds the steering wheel away from its centered position.

Recently, non-centered steering wheel input mechanisms have been proposed for tracked vehicles, such as described in U.S. Pat. No. 6,000,490. In a vehicle with such a mechanism there may be no indication of its turning status until the vehicle starts to move. Thus, an operator who has previously performed a counterrotation turn and then stops the vehicle for some time, may not remember the vehicle turning status upon resumption of vehicle motion. It would be undesirable for an operator to rapidly accelerate a vehicle, while believing it would travel straight, when in reality it would begin turning.

SUMMARY OF THE INVENTION

Accordingly, an object of this invention is to provide a steering control system for a vehicle with a non-centered steering wheel which prevents or reduces the severity or likelihood of unintended turning upon rapid vehicle acceleration during startup.

These and other objects are achieved by the present invention, wherein a control system is provided for a tracked vehicle drive/steering system which has an engine driven hydraulic steering pump which drives a hydraulic steering motor. The steering pump is responsive to steering pump control signals, and an operator manipulated non-centered steering wheel generates steering pump command signals. A steering motor provides an input to a differential track drive mechanism which responds to manipulation of the steering wheel and drives left and right tracks, and turns the vehicle at turning rates which depend on the magnitude of the steering pump control signals. In one embodiment, the control system operates to gradually reduce the magnitude of the steering pump control signals if the vehicle is stationary, the clutch is engaged and these conditions persist for at least a certain time period, and to further or more rapidly reduce the magnitude if the vehicle seat is not occupied. In an alternate embodiment, the control system operates to limit the magnitude of the steering pump control signals as a function of the acceleration of wheel speed. In another alternate embodiment, the control system operates to quickly reduce the magnitude of the steering pump control signals if the vehicle is stationary, the clutch is engaged and the transmission is commanded to be in a non-neutral gear, between the time the gear is commanded and the vehicle motion begins.

DESCRIPTION OF THE PREFERRED EMBODIMENT

Figure 1:
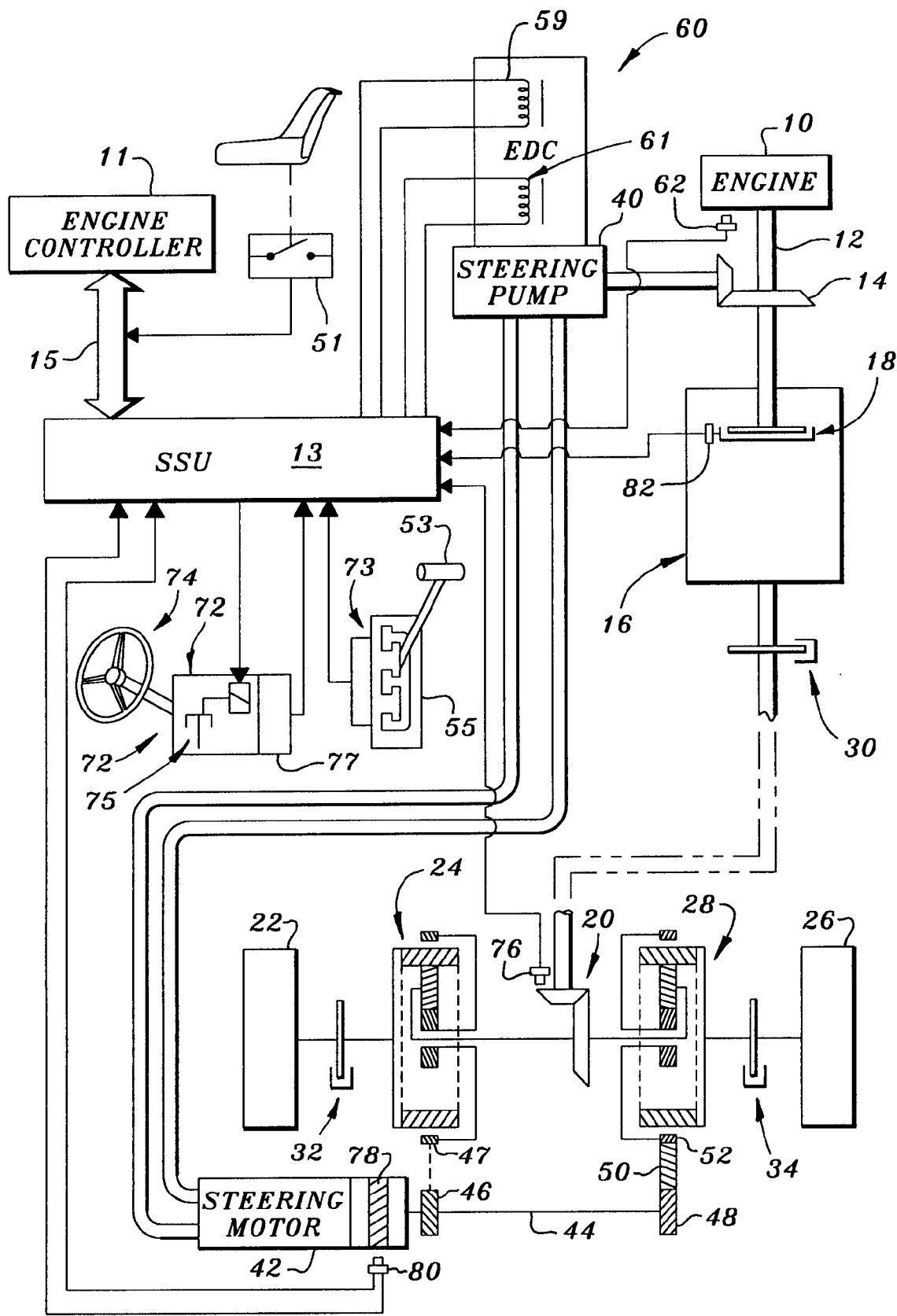
FIG. 1 is a simplified schematic diagram of a tracked vehicle drive and the control system of the present invention.

Referring to FIG. 1, an engine 10 of a tracked vehicle has an output shaft 12 which drives a right angle gear 14 and a transmission 16, such as a 16-speed powershift transmission which is available on production John Deere 8000T tractors. The transmission 16 includes hydraulically operated clutches and brakes (not shown), various ones of which will operate as a main clutch 18 in response to a conventional clutch pedal and linkage (not shown). The engine 10 is controlled by an electronic engine control unit 11. The electronic engine control unit 11 is communicated with a steering system unit (SSU) 13 via a bus 15.

The transmission 16 drives a final or right angle drive 20, which drives a left track drive wheel 22 via left steering planetary drive 24, and a right track drive wheel 26 via right steering planetary drive 28. The steering planetary drives 24 and 28 are preferably such as described in U.S. Pat. No. 5,390,751, issued Feb. 21, 1995 to Puetz et al., and assigned to the assignee of this application. Additional outboard planetaries (not shown), as provided on John Deere 8000T tractors, are mounted between the steering planetaries and the respective drive wheels, but are not further described because they are not directly involved in the subject matter of this application. A parking brake 30 is coupled to the output shaft of transmission 16, and left and right service brakes 32, 34 are coupled to the left and right drive wheels 22, 26, respectively.

The right angle gear 14 drives a variable displacement steering pump 40, such as a 75 cc, 90 series pump made by Sauer-Sundstrand. The pump 40, in turn, powers a hydraulic fixed displacement steering motor 42, such as a 75 cc, 90 series motor, also made by Sauer-Sundstrand. The steering motor 42 drives, via a cross shaft 44 and gear 46, a ring gear 47 of left planetary drive 24, and via cross shaft 44, gear 48 and reverser gear 50, a ring gear 52 of right planetary drive 28.

The steering pump 40 has a swashplate (not shown), the position of which is controlled by a swashplate control valve or electronic displacement control (EDC) 60. The EDC is preferably a two stage device with first stage including a flapper type valve operated by a pair of solenoids 59, 61, and a second stage including a boost stage to the pump, such as is used on the production John Deere 8000T Series tracked tractor.

An operator presence switch 51 provides an operator seat presence signal to the SSU 13 via the bus 15. An engine speed sensor 62, such as a commercially available mag pickup, provides an engine speed signal to the SSU 13. The solenoids 59, 61 of valve 60 are controlled by pulse-width-modulated (PWM) pump control signals generated by SSU 13.

An operator controlled steering wheel 74 is preferably connected to a nonspring centered input mechanism 72, such as described in U.S. Pat. No. 6,000,490, and assigned to the assignee of the present application. The input mechanism 72 includes an electromagnetically controlled friction device or brake 75 and a rotary position transducer or incremental encoder 77, such as a commercially available Grayhill Series 63R encoder or an OakGrigsby 900 Optical Encoder. The encoder 77 provides to SSU 13 a steering wheel position signal representing the position of operator controlled steering wheel 74. The encoder 77 generates a plurality, preferably 128, of pulses per each revolution of the steering wheel 74. The SSU 13 then repeatedly generates and updates a COUNT value representing the number of optical encoder pulses corresponding to the movement of the steering wheel 74 relative to the position of the steering wheel 74 at center. For example, a negative COUNT value will be generated when the steering wheel 74 is rotated counterclockwise from its center position, and a positive COUNT value will be generated when the steering wheel 74 is rotated clockwise from its center position. Thus, COUNT has a magnitude which is proportional to its angular displacement from its center position, and a sign representing the direction (clockwise or counterclockwise) from its center position.

The SSU 13 also receives gear shift command signals from gear shift lever mechanism 73, such as described in U.S. Pat. No. 5,406,860, issued Apr. 18, 1995 to Easton et al., and such as used on production John Deere 8000 Series tractors The gear shift lever mechanism 73 includes a shift lever 53 which is movable to forward upshift and downshift, reverse upshift and downshift, neutral and park positions within a guide 55.

A drive line rotation speed sensor 76, preferably a differential Hall-effect speed sensor such as used on production John Deere 8000T tractors, is mounted in proximity to the final drive 20, and provides to the SSU 13 a variable frequency final drive speed or wheel speed signal. A magnetic ring 78 is mounted for rotation with the motor 42, and a Hall-effect transducer 80 mounted near the magnetic ring 78 provides to the SSU 13 an incremental motor position signal and a motor direction signal. A pair of clutch status switches 82 are located within the transmission 16 and are operatively associated with the linkage (not shown) between the clutch pedal (not shown) and the main clutch 18, and provide a clutch status signal to the SSU 13.

The SSU 13 includes a commercially available microprocessor (not shown) which generates the pump control signals which are communicated to the solenoids 59, 61 of valve 60. Preferably the pump control signals are generated as a function of the COUNT value as a result of the SSU executing a main control algorithm (not shown), such as described in co-pending US patent application Ser. No. 09/456,702, filed Dec. 09, 1999, now U.S. Pat. No. 6,208,922 by David J. Easton, entitled Tracked Vehicle Closed Loop Steering System and assigned to assignee of the present application and which is incorporated herein by reference.

Figures 2, 4:
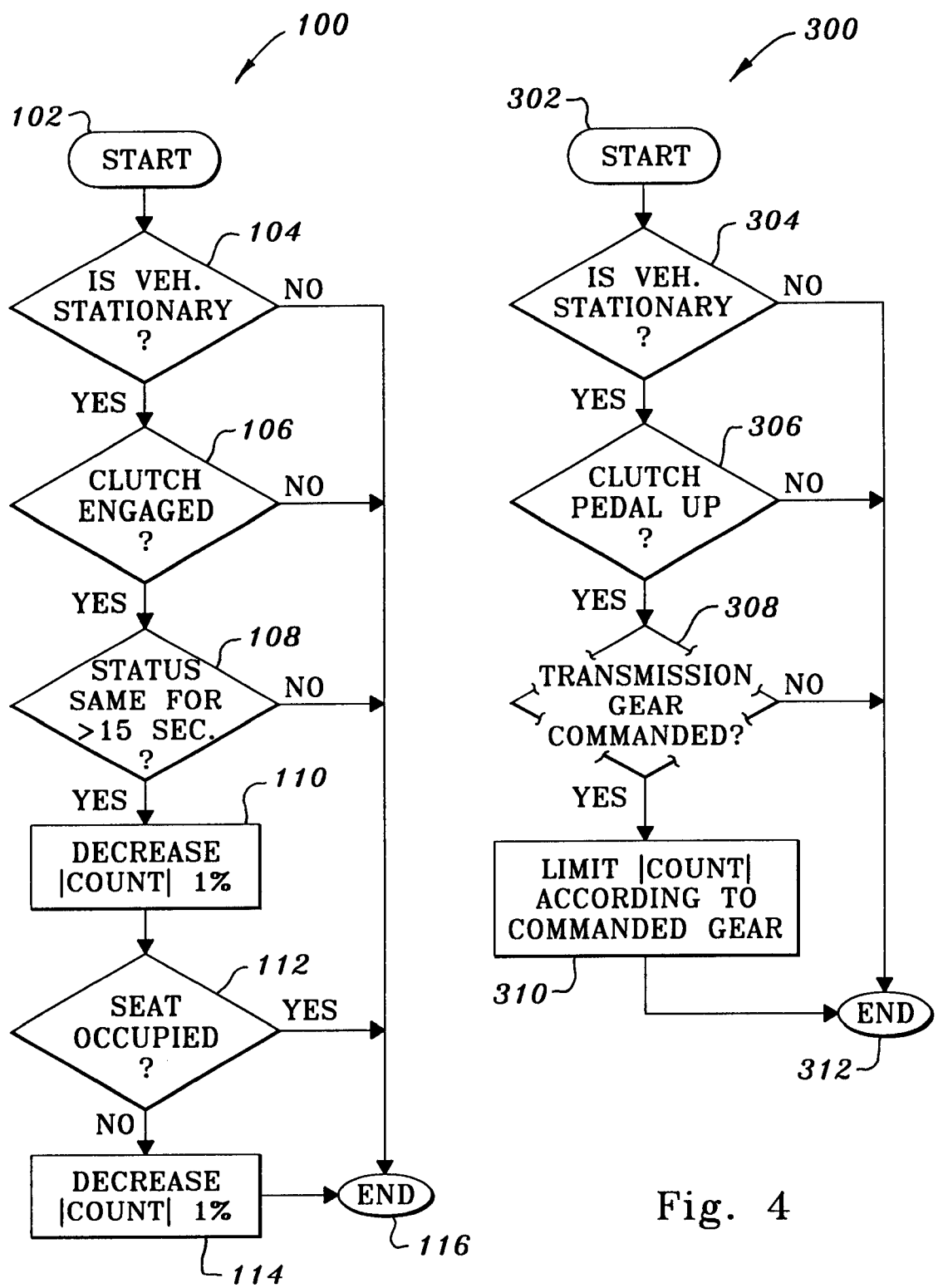
FIG. 2 is a logic flow diagram of an algorithm executed by a microprocessor-based control unit of the control system of FIG. 1 and which implements an embodiment of the present invention.
FIG. 4 is a logic flow diagram of an algorithm executed by a microprocessor-based control unit of the control system of FIG. 1 and which implements an alternate embodiment of the present invention.

According to the present invention, every 20 milliseconds, the SSU 13 also executes a subroutine or algorithm 100 which is illustrated by FIG. 2. The algorithm 100 starts at step 102. Step 104 directs execution to step 116 and terminates operation if the wheel speed from sensor 76 indicates the vehicle is stationary. Step 106 directs execution to step 116 and terminates operation if the clutch 18 is not engaged. Step 108 directs execution to step 116 and terminates operation if the conditions tested for by steps 104 and 106 have not been in effect for at least 15 seconds. If steps 104–108 do not terminate the algorithm, then step 110 decreases the magnitude of the COUNT value by an increment such as 1%. Step 112 directs execution to step 116 and terminates operation if the operator presence switch 51 indicates that the vehicle seat is occupied, otherwise, step 114 further decreases the magnitude of the COUNT value by an increment such as 1%. Step 116 returns execution to the main algorithm (not shown).

Thus, since it is executed every 20 milliseconds, the algorithm 100 operates to gradually reduce the magnitude of COUNT if the vehicle is stationary, the clutch is engaged and these conditions persist for at least a certain time period. The algorithm 100 operates to further or more rapidly reduce the magnitude of COUNT if the vehicle seat is not occupied. The algorithm 100 operates to reduce the magnitude of COUNT, even if the steering wheel 74 is not manipulated by the operator. If these conditions persist for a sufficient time period, the COUNT value magnitude can be reduced to zero, or some other chosen quantity. If the vehicle is then accelerated after the COUNT value is reduced by repetitive operation of algorithm 100, then the turning rate of the vehicle will be less than that which would have occurred had the COUNT value remained unchanged.

Figure 3:
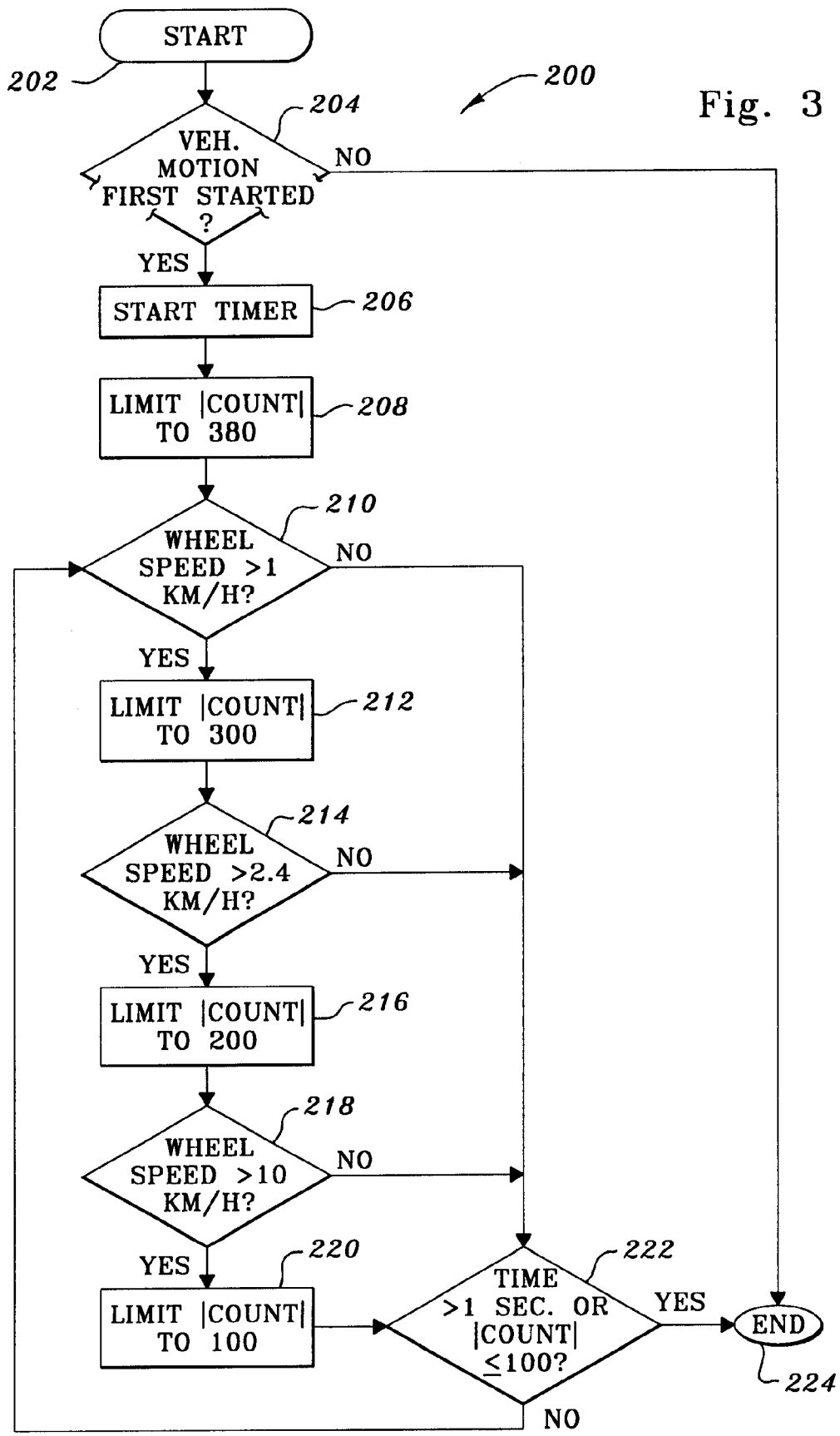
FIG. 3 is a logic flow diagram of an algorithm executed by a microprocessor-based control unit of the control system of FIG. 1 and which implements an alternate embodiment of the present invention.

Alternatively, or in addition, the SSU 13, every 20 milliseconds, executes a subroutine or algorithm 200 which is illustrated by FIG. 3. The algorithm 200 starts at step 202. Step 204 directs execution to step 206 if the wheel speed first indicates the vehicle is no longer stationary, for example, such as when the vehicle is just beginning to be put into motion, otherwise, step 204 directs execution to step 224 which terminates the subroutine 200.

Step 206 then starts a timer which counts up from zero time. Step 208 then limits the magnitude of COUNT (without changing its sign) to a predetermined value, such as 380 (representing 540 degrees of steering wheel rotation from its centered position).

Then, step 210 then directs the subroutine 200 to step 222 if the wheel speed is not greater than a threshold, such as about 1 km/h. If the wheel speed is greater than about 1 km/h, then step 212 limits the magnitude of the COUNT to a value of 300, for example (again without changing its sign).

Then, step 214 directs the subroutine 200 to step 222 if the wheel speed is not greater than a threshold, such as about 2.4 km/h. If the wheel speed is greater than 2.4 km/h, then step 216 limits the magnitude of the COUNT to a value of 200 (representing 280 degrees of steering wheel rotation from its centered position), for example (again without changing its sign).

Then, step 218 directs the subroutine 200 to step 222 if the wheel speed is not greater than a threshold, such as about 10 km/h. If the wheel speed is greater than 10 km/h, then step 220 limits the magnitude of the COUNT to a value of 100 (representing 140 degrees of steering wheel rotation from its centered position), for example (again without changing its sign).

Step 222 directs execution to step 224 if more than 1 second has elapsed since the timer was started in step 206 or if the magnitude of COUNT is less than or equal to 100, otherwise execution is returned to step 210. Step 224 terminates the subroutine 200 and returns execution to the main algorithm (not shown).

Thus, the algorithm 200 operates to limit the magnitude of COUNT (and thereby limit the magnitude of the pump control signal) as a function of the acceleration of wheel speed. If wheel speed increases slowly once motion begins, the operator will sense the turn radius before significant steering movement occurs. If the acceleration is sudden, the operator will not be able to quickly compensate for a surprisingly sharp turn, so the value of COUNT is reduced or limited as a result of steps 210–220. The particular speed threshold values may be varied without departing from the scope of the invention. COUNT limitation only occurs within the first second after the wheel speed sensor 74 indicates that vehicle motion has begun.

Alternatively, or in addition, the SSU 13, every 20 milliseconds, executes a subroutine or algorithm 300 which is illustrated by FIG. 4. The algorithm 300 starts at step 302. Step 304 directs execution to step 312 and terminates operation if the vehicle is not stationary. Step 306 directs execution to step 312 and terminates operation if the clutch 18 is not engaged. Step 308 directs execution to step 312 if no transmission gear is commanded by the shift lever 53. If steps 304–308 do not terminate the algorithm, then step 310 limits the magnitude of the COUNT value (representing the current position of the steering wheel 74). Preferably, the magnitude of the steering pump control signal will be limited to a lower value for higher commanded gears and the magnitude of the steering pump control signal will be limited to higher values for lower commanded gears. As a result, a less sharp turn will be produced at higher commanded transmission gears. Step 312 terminates operation of subroutine 300 and returns execution to the main algorithm (not shown).

Thus, algorithm 300 operates to quickly reduce the magnitude of COUNT if the vehicle is stationary, the clutch 18 is engaged and the transmission 16 is commanded to be in a non-neutral gear, between the time the gear is commanded and the vehicle motion begins. The algorithm 300 operates to reduce the magnitude of COUNT, even if the steering wheel 74 is not manipulated by the operator. If the vehicle is then accelerated after the COUNT value is reduced by operation of algorithm 300, then the turning rate of the vehicle will be less than that which would have occurred had the COUNT value remained unchanged.

Each of these subroutines operates to modify the COUNT value which is used by the main algorithm (not shown) which generates the pump control signal. If desired, any one or any combination of subroutines 100, 200 or 300 could be used. The conversion of these flow charts into a standard language for implementing the algorithms described by the flow charts in a digital computer or microprocessor, will be evident to one with ordinary skill in the art.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A control system for a tracked vehicle drive/steering system having an engine driven hydraulic steering pump which drives a hydraulic steering motor, the steering pump being responsive to variable magnitude steering pump control signals, an operator manipulated non-spring centered steering device for generating variable magnitude steering command signals, the control system generating the variable magnitude steering pump control signals as a function of the steering command signals, the steering motor providing an input to a differential track drive mechanism, the engine driving the differential track drive mechanism via a transmission, and the differential track drive mechanism drives left and right tracks and turns the vehicle at turning rates which depend on the magnitude of the steering pump control signals, the control system comprising:

a clutch for controlling flow of torque through the transmission;

a clutch sensor coupled to the clutch and generating a clutch status signal;

a wheel speed sensor which generates wheel speed signals; and a steering pump control signal controller responsive to the wheel speed sensor for controlling the magnitude of the steering pump control signal as a function of the wheel speed signal, the steering pump control signal controller gradually reducing the magnitude of the steering pump control signal if, for at least a certain time period, the wheel speed is less than a certain threshold speed and the clutch sensor indicates that the clutch is engaged.

2. The control system of claim 1, further comprising:

an operator presence sensor coupled to a seat of the vehicle and communicated with the steering pump control signal controller, the steering pump control signal controller further reducing the magnitude of the steering pump control signal if the operator presence sensor indicates that the vehicle seat is not occupied.

3. The control system of claim 2, wherein:

the steering pump control signal controller reducing the magnitude of the steering pump control signal more rapidly if the operator presence sensor indicates that the vehicle seat is not occupied.

4. The control system of claim 1, further comprising:

a steering control signal limiter responsive to the wheel speed sensor for limiting the magnitude of the steering pump control signal if the wheel speed signal indicates that the vehicle is accelerating faster than a certain rate.

5. The control system of claim 4, wherein:

the steering control signal limiter is operative only if the wheel speed is first exceeding a slow speed value.

6. The control system of claim 5, wherein:

the slow speed value is less than 1 kilometer per hour.

7. The control system of claim 5, wherein:

the steering control signal limiter is operative only during a certain period of time when said slow speed value is exceeded.

8. The control system of claim 4, wherein:

the steering control signal limiter limits the magnitude of the steering pump control signal to a first higher magnitude if the wheel speed signal indicates that the vehicle is accelerating faster than a first lower acceleration rate, and limits the magnitude of the steering pump control signal to a second lower magnitude if the wheel speed signal indicates that the vehicle is accelerating faster than a second higher acceleration rate.

9. The control system of claim 4, further comprising:

a further steering control signal limiter responsive to the wheel speed sensor, to the clutch sensor and to the gear shift command device, for limiting the magnitude of the steering pump control signal if the wheel speed signal indicates that the vehicle is moving slower than a certain speed, the clutch is engaged and the transmission is commanded to a non-neutral gear.

10. The control system of claim 1, further comprising:

a gear shift command device for generating transmission shift command signals; and a steering control signal limiter responsive to the wheel speed sensor, to the clutch sensor and to the gear shift command device, for limiting the magnitude of the steering pump-control signal if the wheel speed signal indicates that the vehicle is moving slower than a certain speed, the clutch is engaged and the transmission is commanded to a non-neutral gear.

11. A control system for a tracked vehicle drive/steering system having an engine driven hydraulic steering pump which drives a hydraulic steering motor, the steering pump being responsive to variable magnitude steering pump control signals, an operator manipulated non-spring centered steering device for generating variable magnitude steering command signals, the control system generating the variable magnitude steering pump control signals as a function of the steering command signals, the steering motor providing an input to a differential track drive mechanism, the engine driving the differential track drive mechanism via a transmission, and the differential track drive mechanism drives left and right tracks and turns the vehicle at turning rates which depend on the magnitude of the steering pump control signals, the control system comprising:

a wheel speed sensor which generates wheel speed signals; and a steering pump control signal controller responsive to the wheel speed sensor for controlling the magnitude of the steering pump control signal as a function of the wheel speed signal, the steering control signal controller limits the magnitude of the steering pump control signal if the wheel speed signal indicates that the vehicle is accelerating faster than a certain rate.

12. The control system of claim 11, wherein:

the steering control signal controller is operative only if the wheel speed is first exceeding a slow speed value.

13. The control system of claim 12, wherein:

the slow speed value is less than 1 kilometer per hour.

14. The control system of claim 12, wherein:

the steering control signal controller is operative only during a certain period of time when said slow speed value is exceeded.

15. The control system of claim 11, wherein:

the steering control signal controller limits the magnitude of the steering pump control signal to a first higher magnitude if the wheel speed signal indicates that the vehicle is accelerating faster than a first lower acceleration rate, and limits the magnitude of the steering pump control signal to a second lower magnitude if the wheel speed signal indicates that the vehicle is accelerating faster than a second higher acceleration rate.

16. A control system for a tracked vehicle drive/steering system having an engine driven hydraulic steering pump which drives a hydraulic steering motor, the steering pump being responsive to variable magnitude steering pump control signals, an operator manipulated non-spring centered steering device for generating variable magnitude steering command signals, the control system generating the variable magnitude steering pump control signals as a function of the steering command signals, the steering motor providing an input to a differential track drive mechanism, the engine driving the differential track drive mechanism via a transmission, and the differential track drive mechanism drives left and right tracks and turns the vehicle at turning rates which depend on the magnitude of the steering pump control signals, the control system comprising:

a gear shift command device for generating transmission shift command signals;

a clutch for controlling flow of torque through the transmission;

a wheel speed sensor which generates wheel speed signals;

a clutch sensor coupled to the clutch and generating a clutch status signal; and a steering pump control signal controller responsive to the wheel speed sensor for controlling the magnitude of the steering pump control signal as a function of the wheel speed signal, the steering pump control signal controller being responsive to the wheel speed sensor, to the clutch sensor and to the gear shift command device, and limiting the magnitude of the steering pump control signal as a function of the wheel speed signal, clutch engagement and the commanded transmission gear.

17. The control system of claim 16, wherein:

the steering control signal controller limits the magnitude of the steering pump control signal if the wheel speed signal indicates that the vehicle is moving slower than a certain speed, the clutch is engaged and the transmission is commanded to a non-neutral gear.

18. The control system of claim 16, wherein:

the maximum magnitude of the steering pump control signal is lower for higher commanded gears and the maximum magnitude of the steering pump control signal is higher for lower commanded gears.

* * * * *